United States Patent
Chhabra et al.

(10) Patent No.: US 9,009,854 B2
(45) Date of Patent: Apr. 14, 2015

(54) PLATFORM-HARDENED DIGITAL RIGHTS MANAGEMENT KEY PROVISIONING

(71) Applicant: Intel Corporation, Santa Clara, CA (US)

(72) Inventors: Siddhartha Chhabra, Hillsboro, OR (US); Reshma Lal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/719,907

(22) Filed: Dec. 19, 2012

(65) Prior Publication Data

US 2014/0173756 A1    Jun. 19, 2014

(51) Int. Cl.
*H04L 29/06* (2006.01)
*G06F 21/10* (2013.01)
*H04L 9/32* (2006.01)
*H04L 9/08* (2006.01)

(52) U.S. Cl.
CPC ...... *G06F 21/10* (2013.01); *H04L 9/32* (2013.01); *H04L 63/08* (2013.01); *H04L 9/0825* (2013.01)

(58) Field of Classification Search
CPC ....... G06F 21/60; G06F 21/10; G06F 21/602; H04L 9/825; H04L 63/428; H04L 9/32; H04I 63/12
USPC .......................................................... 726/29
See application file for complete search history.

(56) References Cited

U.S. PATENT DOCUMENTS

| | | | |
|---|---|---|---|
| 2003/0063750 A1* | 4/2003 | Medvinsky et al. | 380/277 |
| 2004/0128499 A1* | 7/2004 | Peterka et al. | 713/155 |
| 2005/0278787 A1* | 12/2005 | Naslund et al. | 726/26 |
| 2006/0036554 A1* | 2/2006 | Schrock et al. | 705/75 |
| 2006/0047976 A1* | 3/2006 | Moroney et al. | 713/193 |
| 2006/0050701 A1* | 3/2006 | Peterka et al. | 370/390 |
| 2007/0157295 A1 | 7/2007 | Mangalore et al. | |
| 2007/0226492 A1 | 9/2007 | Peinado et al. | |
| 2009/0165099 A1* | 6/2009 | Eldar et al. | 726/5 |
| 2009/0240938 A1* | 9/2009 | Durand et al. | 713/168 |
| 2010/0058485 A1* | 3/2010 | Gonzalez | 726/27 |
| 2011/0314469 A1* | 12/2011 | Qian et al. | 718/1 |
| 2012/0039474 A1* | 2/2012 | Ho | 380/278 |
| 2012/0163589 A1 | 6/2012 | Johnson et al. | |

FOREIGN PATENT DOCUMENTS

| | | |
|---|---|---|
| KR | 10-2009-0132715 A | 12/2009 |
| WO | 2006/034151 A2 | 3/2006 |

OTHER PUBLICATIONS

Brickell, Erine , "Enhanced Privacy ID from Bilinear Pairing for Hardware Authentication and Attestation", Aug. 20-22, 2010 Published in: Social Computing (SocialCom), 2010 IEEE Second International Conference on , pp. 768-775.*
International Search Report and Written Opinion received for PCT Patent Application No. PCT/US2013/048513, mailed on Oct. 15, 2013, 9 pages.

* cited by examiner

*Primary Examiner* — Hadi Armouche
*Assistant Examiner* — Shahriar Zarrineh
(74) *Attorney, Agent, or Firm* — Thomas R. Lane

(57) ABSTRACT

Embodiments of an invention for platform-hardened digital rights management key provisioning are disclosed. In one embodiment, a processor includes an execution unit to execute one or more instructions to create a secure enclave in which to run an application to receive digital rights management information from a provisioning server in response to authentication of the application by a verification server.

8 Claims, 4 Drawing Sheets

METHOD 400

PLATFORM-HARDENED DIGITAL RIGHTS MANAGEMENT KEY PROVISIONING

BACKGROUND

1. Field

The present disclosure pertains to the field of information processing, and more particularly, to the field of security in information processing systems.

2. Description of Related Art

Many applications of information processing systems require provisioning of a key or keys to a content consumer in order to initiate secure communication with a content server. For example, some approaches to digital rights management require the use of one or more keys to protect the transmission of audio and video content. The secure provisioning of these keys is important to ensuring the security of this approach.

BRIEF DESCRIPTION OF THE FIGURES

The present invention is illustrated by way of example and not limitation in the accompanying figures.

DETAILED DESCRIPTION

Embodiments of an invention for platform-hardened digital rights management (DRM) key provisioning are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

As described in the background section, some approaches to DRM, such as Digital Transmission Content Protection (DTCP), require the use of a pair of keys to protect the transmission of audio and video content from a server to a client. Embodiments of the present invention provide for the use of security features of a processor to ensure that this set of keys and related information may be securely provided to and then securely stored by the client so that the provisioning need not be repeated. A platform-hardened approach provided by an embodiment of the present invention may be preferable to an alternative approach such as one using tamper resistant software or another obfuscation technique.

Figure 1:
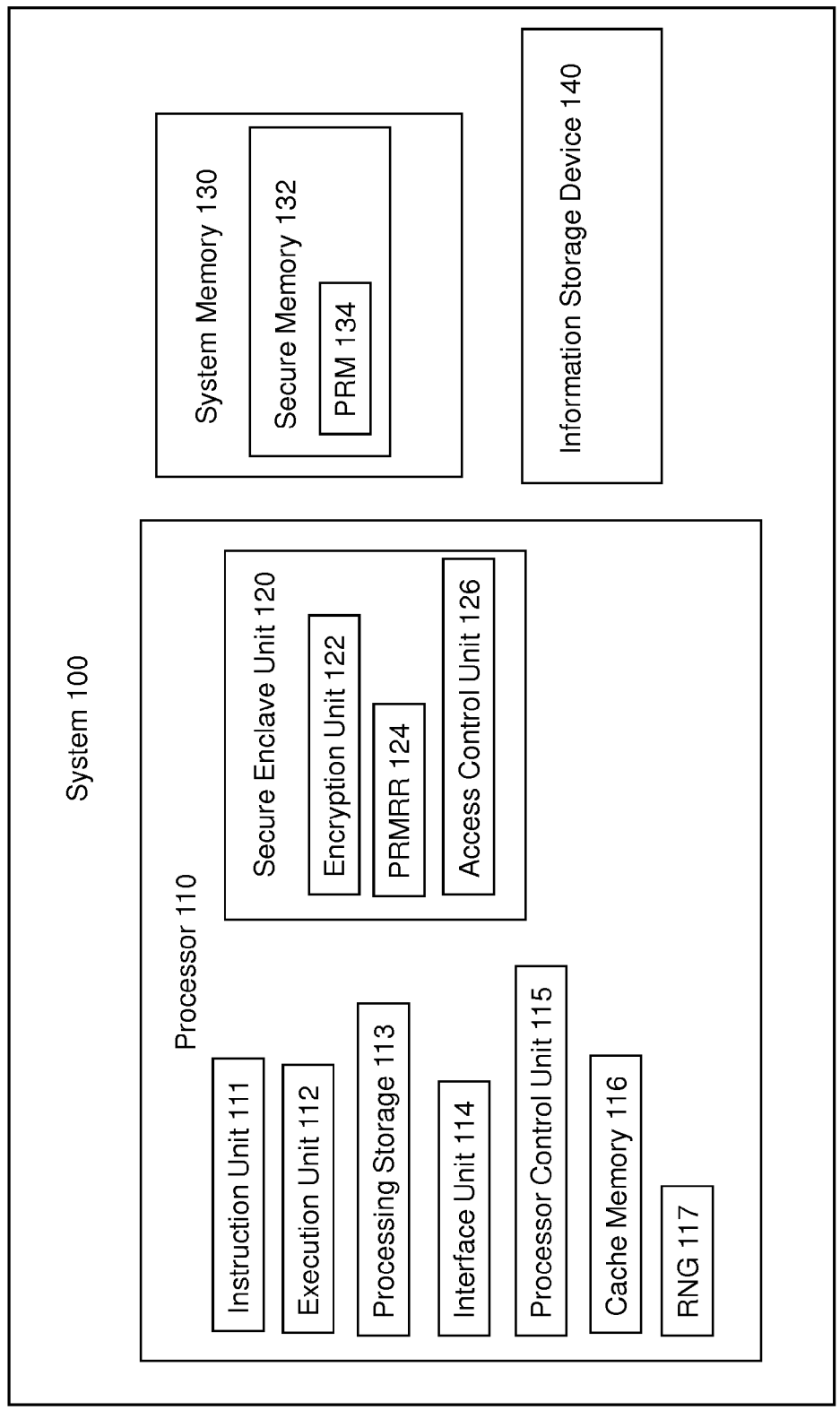
FIG. 1 illustrates a system which may include, enable, or participate in digital rights management key provisioning according to an embodiment of the present invention.

FIG. 1 illustrates system 100, an information processing system in which an embodiment of the present invention may be present and/or operate or which may be a part of an embodiment of the present invention. System 100 may represent any type of information processing system, such as a server, a desktop computer, a portable computer, a set-top box, a hand-held device, or an embedded control system. System 100 includes processor 110, system memory 130, and information storage device 140. Systems embodying the present invention may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

System memory 130 may be dynamic random access memory or any other type of medium readable by processor 110. Information storage device 140 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, cache memory 116, random number generator (RNG) 117, and secure enclave unit 120. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache memory 116 may represent any one or more levels of cache memory in a memory hierarchy of information processing system 100, implemented in static random access memory or any other memory technology. Cache memory 116 may include any combination of cache memories dedicated to or shared among any one or more execution cores or processors within processor 110 according to any known approaches to caching in information processing systems.

RNG 117 may include any circuitry, structure, or other hardware to generate random numbers or pseudo-random numbers according to any known technique. In this embodiment, RNG 117 is a digital RNG within processor 110; however, in other embodiments, RNG 117 may be any type of RNG separate from processor 110.

Secure enclave unit 120 may represent any logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family or other processor family from Intel® Corporation. Although there are multiple embodiments of multiple aspects of the invention, the co-pending U.S. patent application entitled "Method and Apparatus to Provide Secure Application Execution," filed Jun. 19, 2012, Ser. No. 13/527,547, is hereby incorporated by reference as an example of at least one embodiment of a secure enclave. However, the incorporated reference is not intended to limit the scope of embodiments of the invention in any way and other embodiments may be used while remaining within the spirit and scope of the invention.

All or part of secure enclave unit 120 may be included within any one or more other units of processor 110, such as instruction unit 111, execution unit 112, processor storage 113, and processor control unit 115. Secure enclave unit 120 may include encryption unit 122, which may include any logic, circuitry, or other hardware to execute one or more encryption algorithms and the corresponding decryption algorithms, and may include logic, circuitry, or other hardware shared with another encryption unit in processor 110.

Each secure enclave created within system 100 may be allocated a secure or protected space within the system memory space supported by system memory 130. Secure memory 132 represents one or more such secure or protected memory spaces. Each such memory space may be created, allocated, and maintained using known virtual memory, secure enclave, or other system memory addressing techniques such that the information within each such memory space may at various times be stored within any combination of information storage device 140, system memory 130, cache memory 116, processing storage 113, and/or any other memory or storage area within information processing system 100.

Secure memory 132 may include one or more physically contiguous ranges of memory called processor reserved memory (PRM). In one embodiment, a PRM is naturally aligned and has a size that is an integer power of two. System firmware such as a basic input/output system may reserve a PRM, for example by setting a pair of model-specific registers (MSRs), collectively known as a PRM range register (PRMRR). In the embodiment of FIG. 1, secure enclave logic 120 may include PRMRR 124. PRMRR 124 may be used to reserve PRM 134 for processor 110 in secure memory 132.

Secure enclave unit 120 may also include access control unit 126, which may include any logic, circuitry, hardware, or other structures to enforce load and access restrictions using PRMRR 124 such that the information within the memory space of a secure enclave is accessible only to the application running in that secure enclave. For example, the information on a memory page allocated to a secure enclave may be encrypted by encryption unit 122 before being stored in system memory 130, information storage device 140, or any other memory or storage external to processor 110. While stored external to processor 110, the information is protected by encryption and integrity check techniques. When the memory page is loaded into cache memory 116 by an application or process running on processor 110 within the secure enclave to which the page is allocated, it is decrypted by encryption unit 122, then the unencrypted information is accessible only by an application or process running within the secure enclave.

Figure 2:
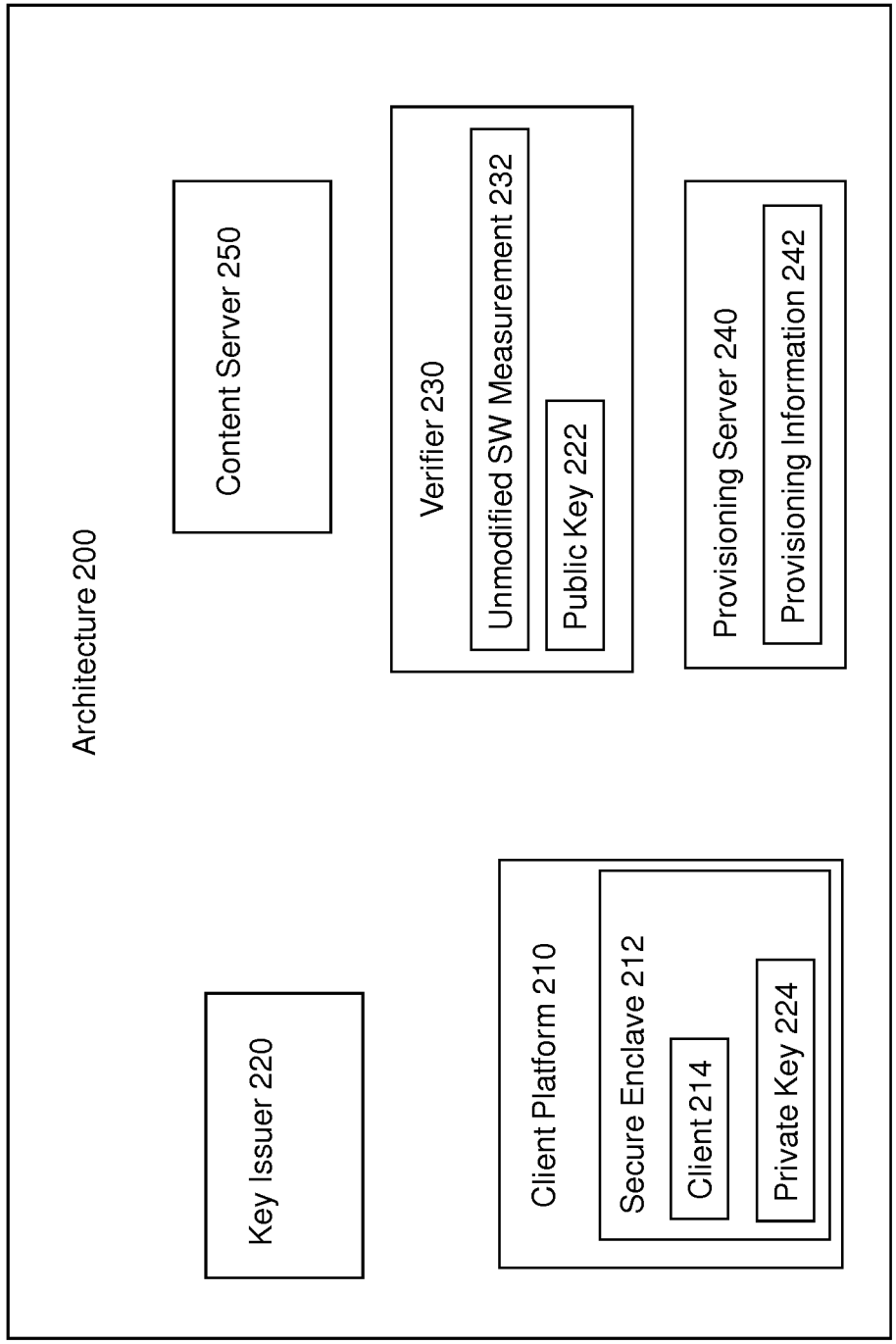
FIG. 2 illustrates an architecture for digital rights management key provisioning according to an embodiment of the present invention.

FIG. 2 illustrates architecture 200 for DRM key provisioning according to an embodiment of the present invention. Architecture 200 includes client platform 210, key issuer 220, verifier 230, provisioning server 240, and content server 250.

Client platform 210 represents a system or platform to run an application to use content to be provided by content server 250. The content may be, for example, any type of audio, visual, or other media content. Client platform 210 may be implemented as an embodiment of information processing system 100. Therefore, secure enclave 212 may be created and maintained on client platform 210, and the application, client 214, which may be, for example, a DTCP media player, may run within secure enclave 212.

Key issuer 220 represents an application, system, platform, or other entity to issue public/private key pairs which may be used for a third party verifier to remotely verify the authenticity of a hardware platform such as client platform 210. In one embodiment, this verification may be performed without revealing the identity of the hardware platform being authenticated, for example, according to the Intel® Enhanced Privacy Identification (EPID) scheme.

Verifier 230 represents an application, system, platform, or other entity to verify the authenticity of a hardware platform according to the approach supported by key issuer 220.

Provisioning server 240 represents an application, system, platform, or other entity to provide a key or keys and/or other information to establish a client as a consumer of secure transmissions of content. For example, server 240 may be a DTCP provisioning server according to the Digital Transmission Licensing Administrator.

Content server 250 represents an application, system, platform, or other entity to provide content and/or other information through a secure transmission. For example, content server 250 may be a DTCP content server.

Figure 3:
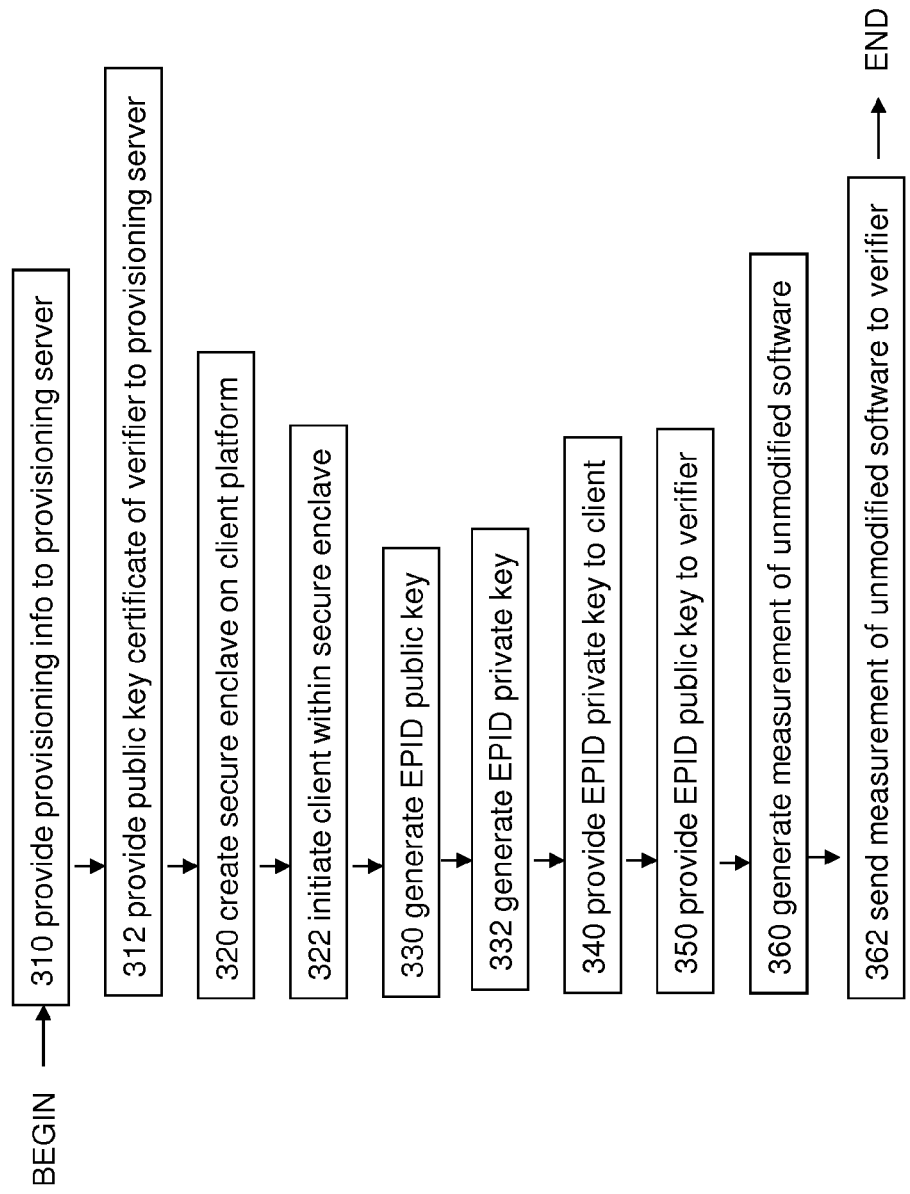
FIG. 3 illustrates a method for pre-provisioning according to an embodiment of the present invention.
Figure 4:
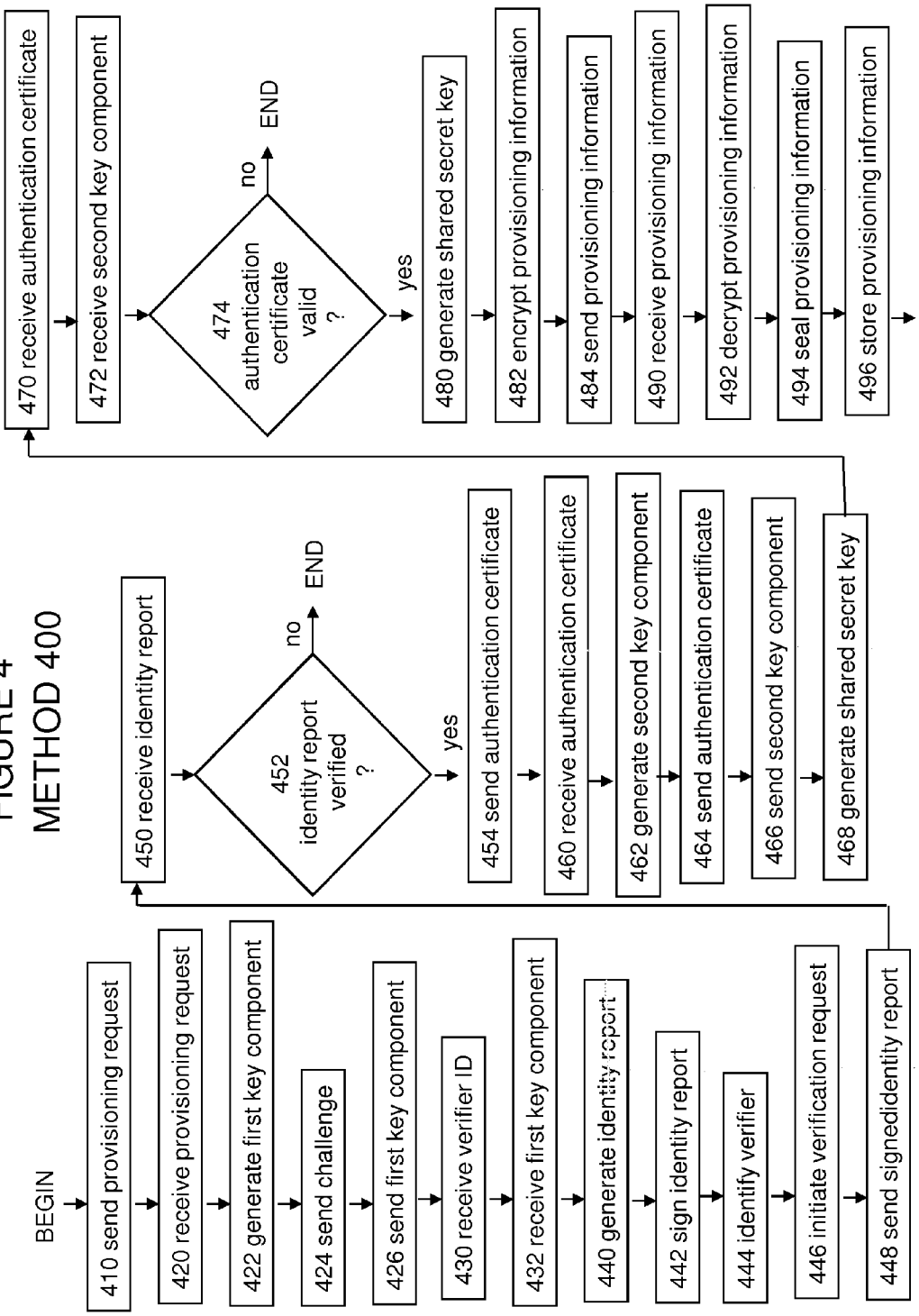
FIG. 4 illustrated a method for provisioning according to an embodiment of the present invention.

FIG. 3 illustrates method 300 for pre-provisioning according to an embodiment of the present invention, and FIG. 4 illustrates method 400 for provisioning according to an embodiment of the present invention. Method 300 may be performed to enable the platform security features used in method 400 or another method for provisioning according to an embodiment of the present invention. Although method embodiments of the invention are not limited in this respect, reference may be made to elements of FIGS. 1 and 2 to help describe the method embodiments of FIGS. 3 and 4.

In box 310, provisioning information is provided to provisioning server 240. In one embodiment, the provisioning information may be the provisioning information that the DTLA specifies to be used by a DTCP client to obtain content from a DTCP content provider. This DTCP provisioning information is a unique device identifier, a public/private key pair (a DTCP key pair), a device certificate, and a revocation mechanism. The first three of these will be referred to collectively as the DTCP provisioning information 242. DTCP provisioning information 242 may be provided by the DTLA in plaintext on media such as a DVD-ROM.

In box 312, public key certificates of verifier 230 are provided to provisioning server 240. These may be provided by a third party certificate authority.

In box 320, secure enclave 212 is created on client platform 210. In box 322, client 214 is initiated within secure enclave 212.

In box 330, key issuer 220 generates EPID public key 222 to be used with an EPID private key as part of a key pair for authentication of hardware. This key pair may be referred to as an EPID key pair, although other authentication schemes may be used within the scope of the present invention. In box 332, key issuer 220 generates unique EPID private key 224 for the EPID key pair. Note that other unique private keys may also be generated and used for authentication of other hardware with EPID public key 222.

In box 340, key issuer 220 provides EPID private key 224 to client 214.

In box 350, key issuer 220 provides EPID public key 222 to verifier 230.

In box 360, an independent software vendor (ISV) generates a report or measurement of the unmodified software of client 214. In box 362, the ISV sends the measurement of unmodified software to verifier 230, for verifier 230 to use during provisioning to verify the authenticity of client 214.

In box 410 of FIG. 4, client 214 running inside secure enclave 212 sends to provisioning server 240 a provisioning request.

In box 420, provisioning server 240 receives the provisioning request from client 214. In box 422, provisioning server 240 generates a first key component ('B') that may be used to generate a shared secret key, for example, through a Diffie-Hellman (DH) key exchange. Therefore, box 422 may be performed by the operation 'B=$g^b$ mod p' where 'b' is private to provisioning server 240 and 'g' and 'p' are public. The Diffie-Hellman key exchange may use the SIGMA protocol to avoid man-in-the-middle attacks. However, any key exchange protocol may be used with the scope of the present invention.

In box 424, provisioning server 240 sends to client 214 a challenge for client 214 to prove its authenticity. Sending the challenge may include sending the identity of a verifier to use to provide proof of authenticity (e.g., verifier 230). In box 426, provisioning server 240 sends to client 214 the first key component.

In box 430, client 214 receives the identity of verifier 230 from provisioning server 240. In box 432, client 214 receives the first key component from provisioning server 240.

In box 440, client 214 generates a report or measurement of its identity, which may be performed, for example, within secure enclave 212 by using the EREPORT instruction, which is a leaf of the ENCLU instruction. In box 442, client 214 signs the report using EPID private key 224. In box 444, client 214 uses the identity information provided by provisioning server 240 to identify verifier 230. In box 446, client 214 initiates a verification request to verifier 230. In box 448, client 214 sends its signed identity report to verifier 230, and may also send other information such an ISV certificate and a security version number.

In box 450, verifier 230 receives the signed identity report from client 214. In box 452, verifier 230 attempts to verify the signed identity report using unmodified software measurement 216 and EPID public key 222. If the verification is successful, then, in box 454, verifier 230 sends an authentication certificate to client 214, and method 400 continues in box 460. If the verification is not successful, method 400 does not continue.

In box 460, client 214 receives the authentication certificate from verifier 230. In box 462, client 214 generates a second key component ('A') that may be used to generate the shared secret key, for example, through a Diffie-Hellman (DH) key exchange. Therefore, box 462 may be performed by the operation 'A=$g^a$ mod p' where 'a' is private to client 214. In box 464, client 214 sends its authentication certificate to provisioning server 240. In box 466, client 214 sends the second key component to provisioning server 240. In box 468, client 214 generates the shared secret key using the first key component and the second key component.

In box 470, provisioning server 240 receives the authentication certificate from client 214. In box 472, provisioning server 240 receives the second key component from client 214. In box 474, provisioning server 240 determines whether the authentication certificate is valid. In so, then method 400 continues in box 480. If not, then method 400 does not continue.

In box 480, provisioning server 240 generates the shared secret key using the first key component and the second key component. In box 482, provisioning server 240 uses the shared secret key to encrypt the provisioning information (e.g., DTCP provisioning information 242). In box 484, provisioning server 240 sends the encrypted provisioning information to client 214.

In box 490, client 214 receives the encrypted provisioning information from provisioning server 240. In box 492, client 214 decrypts the provisioning information using the shared secret key. In box 494, client 214 seals the provisioning information to secure enclave 212, for example using the ESEAL instruction to provide for storing the provisioning information with confidentiality and integrity. The SEAL instruction uses the secure enclave's unique key to encrypt data such that the UNSEAL feature may use the same secure enclave's unique key to decrypt the data and detect any changes to the data, ensuring confidentiality and integrity of the data.

In box 496, the sealed provisioning information may be stored in storage device 140. Therefore, the provisioning information may now be made ready for use by client 214 in secure enclave 212, using the UNSEAL feature, such that client 214 may use content from content server 250 without repeating the provisioning request to provisioning server 240.

In various embodiments of the present invention, the methods illustrated in FIGS. 3 and 4 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of methods 300 or 400 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for platform-hardened DRM key provisioning have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
   initiating a client in a secure enclave;
   requesting, by the client, digital rights management (DRM) provisioning information from a provisioning server;
   receiving, by the client from the provisioning server, a first key component;
   requesting, by the client, authentication by a verification server;
   generating, by the client, a second key component;
   providing, by the client, proof of authentication to the provisioning server;
   sending, by the client to the provisioning server, the second key component;
   generating, by the client, a shared secret key;
   receiving, by the client, the DRM provisioning information;
   decrypting, by the client, the DRM provisioning information using the shared secret key;
   sealing the DRM provisioning information to the secure enclave;
   storing the sealed DRM provisioning information in a non-volatile memory;
   unsealing the DRM provisioning information in the secure enclave; and
   using, by the client, content from a content server without repeating the requesting of DRM provisioning information from the provisioning server.

2. The method of claim 1, wherein the digital rights management information includes a Digital Transmission Content Protection key.

3. The method of claim 1, wherein the authentication involves an Enhanced Protection ID algorithm.

4. The method of claim 1, further comprising generating, by the client, an identity report.

5. The method of claim 4, further comprising signing, by the client using an Enhanced Protection ID (EPID) private key, the identity report.

6. The method of claim 5, wherein requesting authentication includes sending the signed identity report to the verification server.

7. The method of claim 6, further comprising receiving, by the client from the verification server, proof of authentication, wherein the authentication involves verifying the signed identity report.

8. The method of claim 7, wherein verifying the signed identity report uses an EPID public key corresponding to the EPID private key.

* * * * *